United States Patent [19]

Tsunoda et al.

[11] Patent Number: 4,862,218

[45] Date of Patent: Aug. 29, 1989

[54] SUPPORT AND ADJUSTING APPARATUS FOR AN OPTICAL UNIT

[75] Inventors: Arihiro Tsunoda, Higashiosaka; Kikunosuke Tsuji, Sakai; Akira Nakakuma, Takaishi; Tetsuya Matsushita, Osaka, all of Japan

[73] Assignee: Mita Industrial Co., Ltd., Osaka, Japan

[21] Appl. No.: 101,921

[22] Filed: Sep. 28, 1987

[30] Foreign Application Priority Data

Sep. 30, 1986 [JP] Japan ................................ 61-232250
Sep. 30, 1986 [JP] Japan ................................ 61-232251

[51] Int. Cl.⁴ ..................... G03G 15/28; G03G 15/00; G03B 27/32; G03B 27/54
[52] U.S. Cl. ..................................... 355/235; 355/39; 355/55; 355/67; 355/233
[58] Field of Search ................... 355/8, 39, 40, 45, 55, 355/58, 67, 3 R, 14 R

[56] References Cited

U.S. PATENT DOCUMENTS

| | | | |
|---|---|---|---|
| 4,332,460 | 6/1982 | Costanza | 355/8 |
| 4,353,643 | 10/1982 | Statt | 355/57 |
| 4,401,384 | 8/1983 | Abe | 355/8 X |
| 4,634,261 | 1/1987 | Nagoshi | 355/8 |
| 4,685,795 | 8/1987 | Yoshimura | 355/8 |
| 4,710,017 | 12/1987 | Watanabe et al. | 355/8 |

Primary Examiner—A. T. Grimley
Assistant Examiner—Edward Pipala
Attorney, Agent, or Firm—Beveridge, DeGrandi & Weilacher

[57] ABSTRACT

A supporting apparatus for optical unit having an optical unit to expose an original set on a contact glass, a reciprocatingly movable supporting frame body equipped with the optical unit, a sliding member provided on both ends of the supporting frame body, and an eccentric cam mechanism provided on one end of the supporting frame body to vertically adjust one of the sliding member. By operating the eccentric cam mechanism, one end of the supporting frame body can be adjusted to a desired height so as to enable to adjust horizontality of the optical unit mounted on the supporting frame body. Furthermore, because a large gap is provided between a pair of sliding members provided on one end of each supporting frame body and the ends of the two supporting frame bodies where the sliding members are mounted are mutually disposed at reverse side, both supporting frame bodies can be caused to come as close at their home positions as possible.

8 Claims, 8 Drawing Sheets

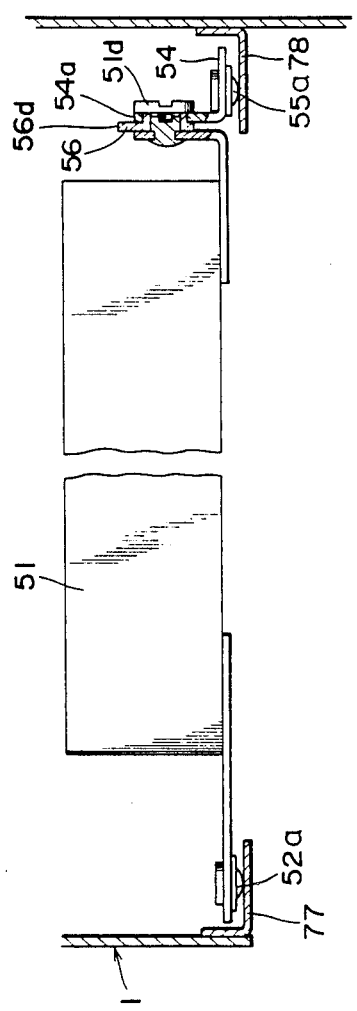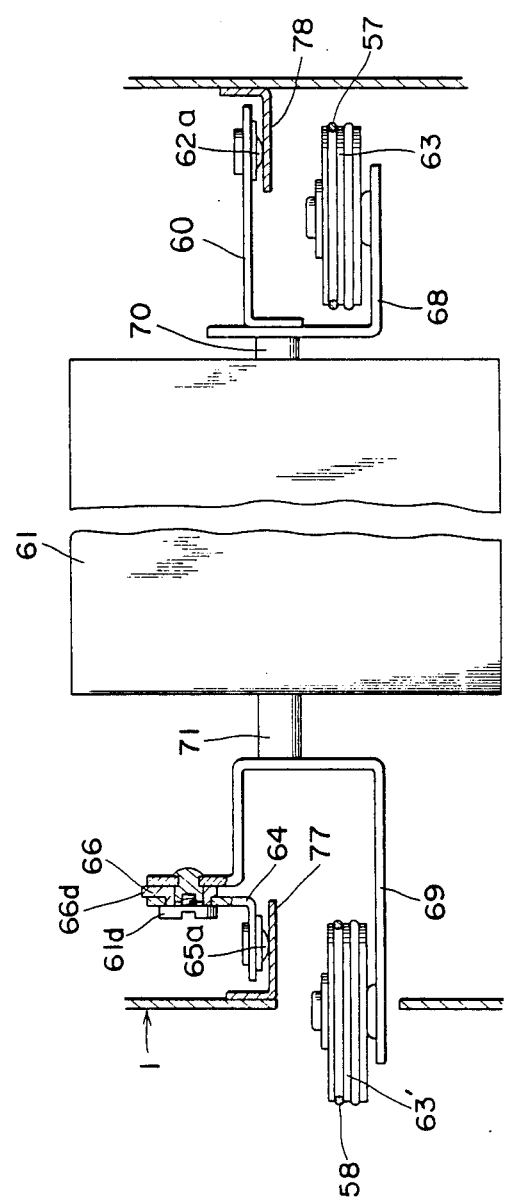

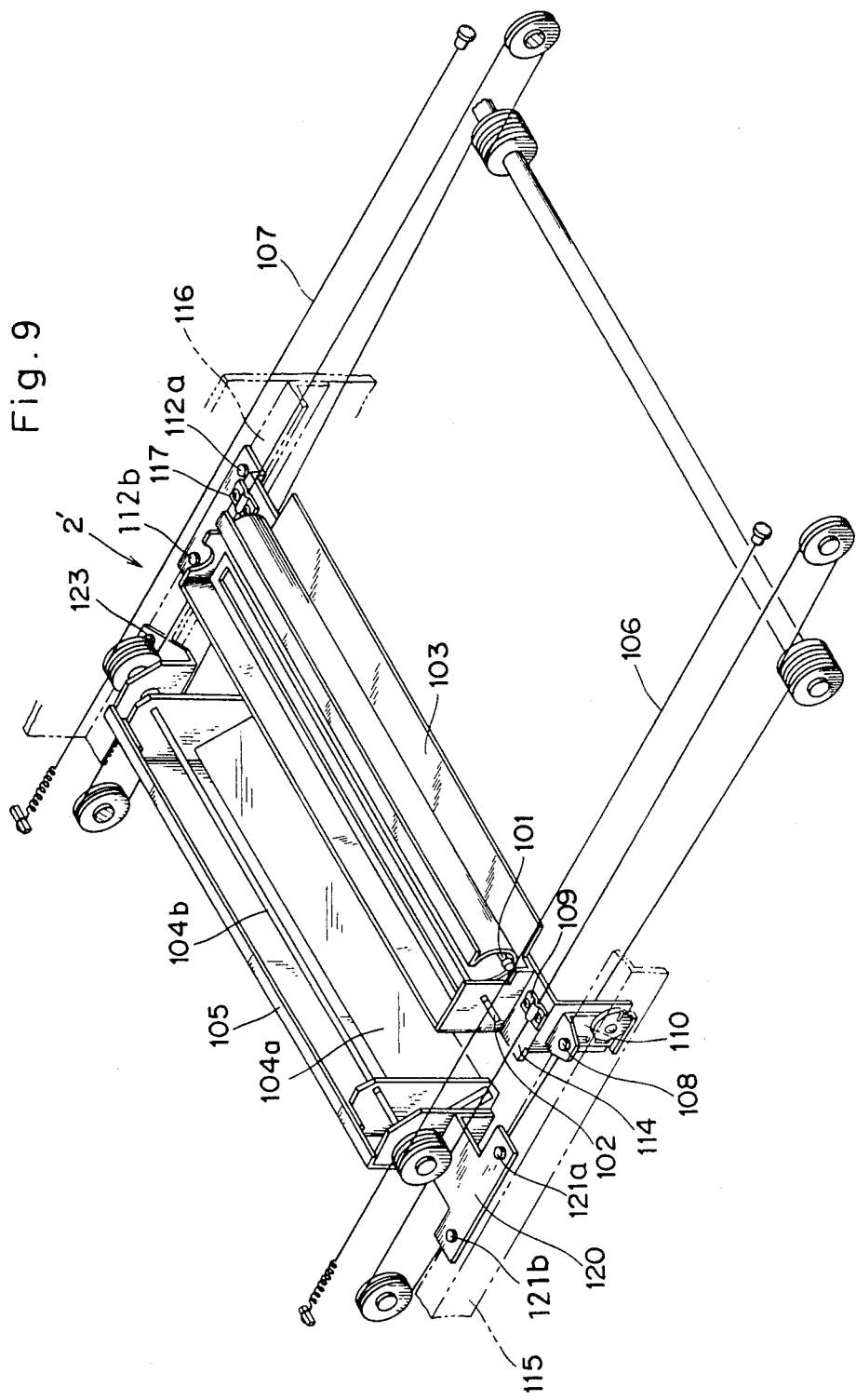

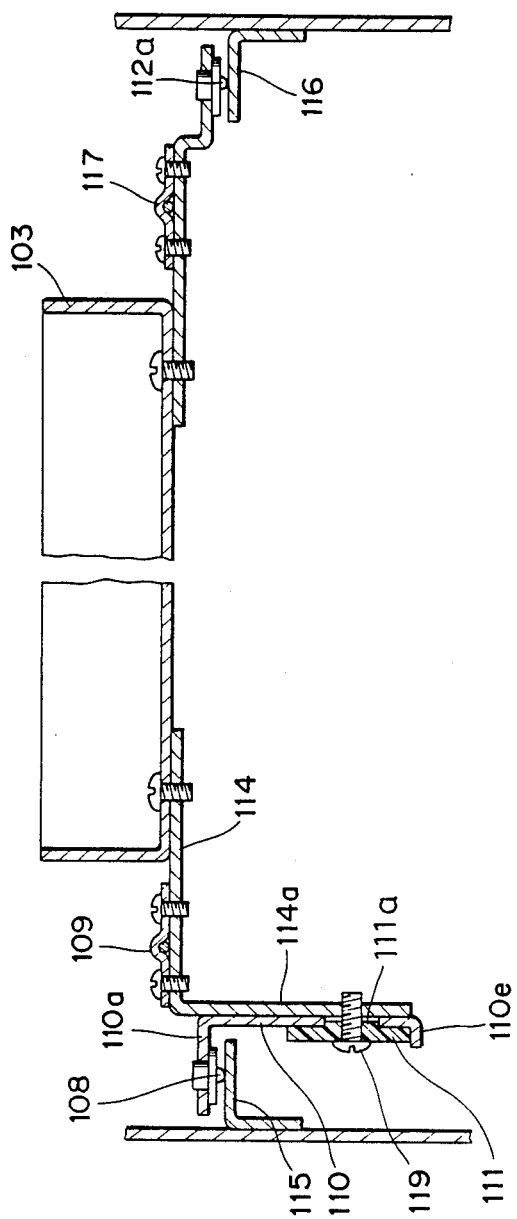

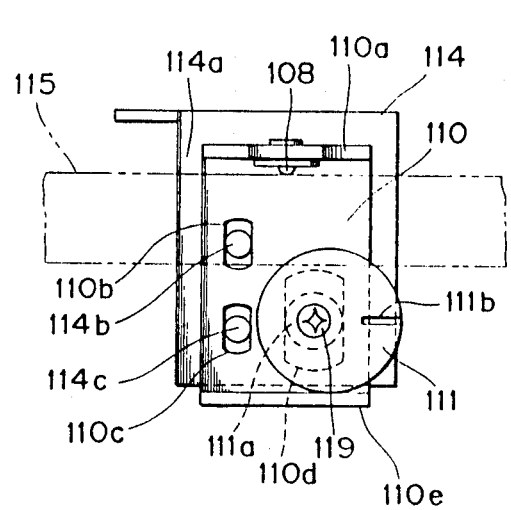
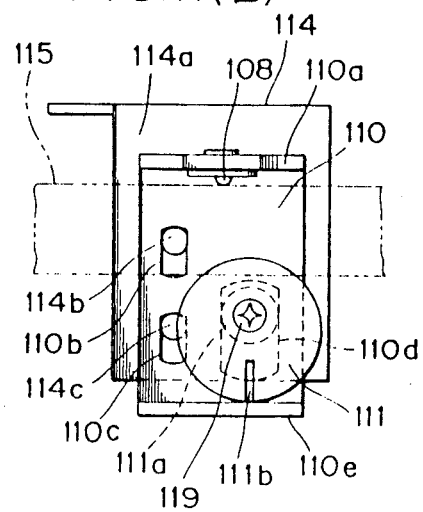
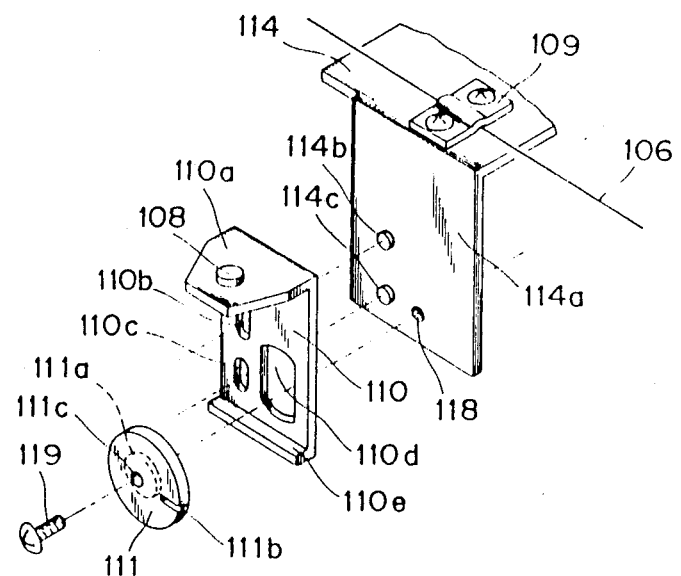

SUPPORT AND ADJUSTING APPARATUS FOR AN OPTICAL UNIT

BACKGROUND OF THE INVENTION

The present invention relates to a supporting apparatus for an optical unit which is stably supported on a slider, the optical unit being consisted of components such as a light source and a reflector which reciprocate to scan and expose an original set on a contact glass.

To accomplish overall reduction in size and increase in operating speed of a picture image forming apparatus, there has been conventionally provided a number of apparatuses, in which an optical unit consisting of components such as a light source and a reflector disposed under a fixed glass is caused to reciprocate to scan and expose an original set on the contact glass.

A structure in which an optical unit is caused to reciprocate in such manner as above includes the following for example; wherein a sliding member is installed under both ends of a first supporting frame body which supports a light source, a concave mirror to converge the light irradiated from the light source and other components, and a second supporting frame body which supports a plane reflector to reflect the reflected light from the original and other components. The sliding member employs a small piece which slides over the slider. A sliding member at each end of the supporting frame body is supported on the rail-like slider. At each end of the supporting frame body is connected a driving wire and the driving force is transmitted to both sides of the supporting frame body through this driving wire (U.S. Pat. Nos. 4,332,460 and 4,353,643).

With the above construction, because the height of the supporting frame body can not be adjusted with respect to the slider, it may become impossible to correct dimensional errors of such components as the supporting frame body and/or slider or errors caused during assembly, so as not to maintain the horizontality of the supporting frame body. Under this condition, the intensity of the light irradiated to an original may not be uniform, or the position of the light reflected from the original and condensed on a photosensitive drum may shift causing to generate a shade on a picture image formed on a copying paper, or the focus of the picture image may become fuzzy or otherwise the picture image may be distorted.

Then, an apparatus is suggested, in which the horizontality of the supporting frame body is adjustable by adjusting the protruding length of each of the sliding member of above disposed under the supporting frame body. More specifically, each sliding member is mounted on the tip of the screws which vertically pass through both ends of the supporting frame body. By turning these screws, the protruding length of each sliding member disposed under the supporting frame body can be adjusted (Japanese Unexamined Utility Model Publication No. 138932/1983). By making adjustments in such manner as above, not only the supporting frame body but also the optical member mounted thereon can be maintained horizontally.

However, in the construction of above, because there are several screw members which need a number of adjustments to be made, it takes time to make adjustments to maintain the supporting frame body horizontally. In addition, there is a problem which requires extra handling such as paint locking to prevent the screw member from becoming loose after an adjustment is once made. Furthermore, because screwing and unscrewing from above are employed, it becomes necessary to remove the contact glass, which affects the workability.

By the way, if one tries to support the supporting frame body on the slider using sliding members, normally at least three sliding members become necessary. To put it in another word, a pair of sliding members to slide over one slider and one sliding member to slide over the other slider will be necessary, and it is preferable that the pair of sliding members to slide over one slider of above are disposed at a wide gap because such arrangement can maintain the stability while the supporting frame body is moving. When the supporting frame bodies having above sliding members are placed respectively at its home position, the gap between both supporting frame bodies can not be made too small because the gap of the pair of the sliding members is wide and such arrangement as this causes a picture image forming apparatus to become large in size. Another problem involved in the above arrangement is that if one tries to reduce the gap between both supporting frame bodies of the above to prevent the picture image forming apparatus from becoming large in size, the stability is affected while the supporting frame bodies are moving and the quality of the picture image obtained will be deteriorated because the gap between the pair of sliding members of the above must also be reduced.

Even in the event the supporting frame bodies are placed at their home positions, there is a suggested structure of which the gap between both supporting frame bodies can be reduced. The suggested structure comprises two sliders disposed above and below, one of which supports the first supporting frame body slidably and the other of which supports the second supporting frame body slidably (Japanese Unexamined Patent Publication No. 37670/1983). In an apparatus with such structure as above, it has an advantage wherein even if the gap between a pair of sliding members on one side and/or on both sides of respective supporting frame bodies is expanded, both supporting frame bodies can be caused to be closer as much as possible at their home positions. However, because the sliders are disposed at two stages of above and below, idle spaces will increase in vertical direction, the picture image forming apparatus will become large, and the slider structures will also become complicated, all of which result in cost increase.

The first object of the present invention is to provide a supporting apparatus for optical unit wherein the horizontality of the supporting frame body mounted with the optical unit can be easily adjusted without removing the contact glass.

The second object of the present invention is to provide a supporting apparatus for optical unit in which the stability in moving of the supporting frame body is improved, and by causing both supporting frame bodies to be closer at their home positions, the reduction of size of the picture image forming apparatus can be achieved.

The first object of above can be accomplished by providing the supporting apparatus for optical unit described hereunder: wherein the supporting apparatus for optical unit comprises a reciprocatingly movable supporting frame body mounted with a light source to illuminate the original on the contact glass, and a reciprocatingly movable supporting frame body mounted with a reflecting mirror to reflect a light reflected from the original, sliding members provided on both ends of at least one of the supporting frame body of above, and an eccentric cam mechanism provided at one end of the supporting frame to make vertical adjustments of one sliding member provided at the same end.

By the structure of the above, sliding members are installed on both sides of reciprocatingly movable supporting frame bodies mounted with optical units, and one of the sliding members is vertically adjustably installed on the supporting frame body by means of the eccentric cam mechanism, and therefore, one end of the supporting frame body where the aforementioned vertically adjustable sliding member is installed can be adjusted to a desired height only by handling the eccentric cam mechanism. Thus it becomes possible to adjust horizontality of the supporting frame body as well as the optical unit mounted on the supporting frame body. Moreover, because the eccentric cam mechanism can be manually operated from transverse direction, there is no necessity to remove the contact glass for adjustment.

In addition, in the supporting apparatus for optical unit according to the present invention, it is preferable that a pair of sliding members are installed on both ends of the above supporting frame bodies, so that the sliding members of either one of the pairs can be vertically adjusted by means of the eccentric cam mechanism and the pair can be freely rotated about an eccentric shaft.

In such a case, by operating the eccentric cam mechanism it becomes possible to adjust horizontality of the supporting frame body and also adjust horizontality of the optical unit mounted on the supporting frame, and by rotation of the sliding members of either one of the pair about the eccentric shaft, two pairs of sliding members come in continuous contact with the top surface of respective sliders. Therefore, it is possible to always maintain a condition wherein the sliding members are supported continuously on the sliders.

In the optical unit supporting apparatus according to the present invention, a pair of sliding members may be mounted on one end of the supporting frame body, and one sliding member may be provided on the other end of the supporting frame body vertically adjustably by means of an eccentric cam mechanism.

In the case of above, by operating the eccentric cam mechanism horizontality of the supporting frame body can be adjusted and horizontality of the optical unit installed on the supporting frame can also be adjusted, and by means of a total of three sliding members, of which a pair of sliding members are installed on one end of the supporting frame body and the remaining one is installed on the other end thereof, it is possible to always maintain a condition wherein the sliding members are continuously supported on the sliders.

The second object of above can be accomplished by providing the optical unit supporting apparatus of the following: there are provided a reciprocatingly movable supporting frame body mounted with a light source to illuminate the original on the contact glass, and a reciprocatingly movable supporting frame body mounted with a reflecting mirror to reflect the light reflected from the original, wherein one end of either one of the supporting frame bodies is provided with a pair of sliding members having relatively large gap therebetween, the other end thereof is provided with a pair of sliding members having relatively small gap therebetween or with one sliding member, the end of the other supporting frame body on the same side of the above one end is provided with a pair of sliding members having relatively small gap therebetween or with one sliding member, and the reverse end thereof is provided with a pair of sliding members having relatively large gap therebetween.

By a structure such as above, on the upper surface of one slider are supported a pair of sliding members having relatively large gap mounted on one supporting frame body and a pair of sliding members having relatively small gap mounted on the other supporting frame body or one sliding member, on the upper surface of the other slider are supported a pair of sliding members having relatively small gap mounted on one supporting frame body or one sliding member, a pair of sliding members having relatively large gap mounted on the other supporting frame body, and both supporting frame bodies can thus be caused to come closer at their home positions. By expanding the gap between a pair of sliding members mounted on each supporting frame body, the stability in moving can be secured.

Features of the present invention will be more apparent in the following description and by referring to the accompanying drawings.

BRIEF DESCRIPTION OF THE DRAWINGS

FIG. 6 is a side view of the first supporting frame body;

FIG. 7 is a side view of the second supporting frame body;

FIG. 9 is a perspective diagram showing other embodiment;

FIG. 10 is a sectional side view of the first supporting frame body;

FIG. 11 is a diagram describing the operation of the eccentric cam mechanism in the embodiment shown in FIG. 9; and FIG. 12 is a perspective diagram of the eccentric cam mechanism in the embodiment shown in FIG. 9.

DETAILED OF THE EMBODIMENTS

Figure 8:
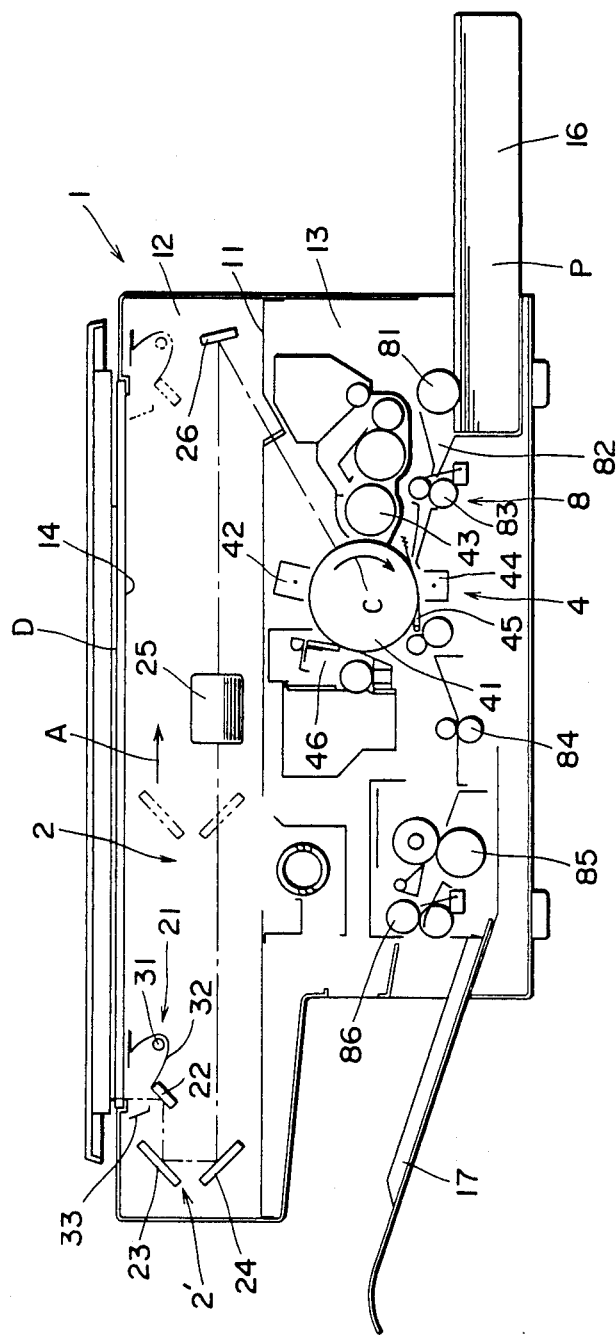
FIG. 8 is a schematic diagram showing the inside mechanism of a copying machine.

FIG. 8 is a schematic diagram clearly illustrating the inside structure of a copying machine equipped with the optical unit supporting apparatus according to the present invention.

The numeral 1 represents a body of the copying machine, and the inside of the body of the copying machine is divided into an upper chamber 12 and a lower chamber 13 by a partition board 11. In the upper chamber 12, an optical system 2 to scan and expose the original D is provided and in the lower chamber 13, a copy processing unit 4 to form a copied picture image on the copying paper P and a copying paper conveying unit 8 are provided.

The optical system 2 has a light source 21 consisted of a luminous body 31, main reflection board 32 and sub reflection board 33, plane reflecting mirrors 22 to 24, lens 25, and a plane reflecting mirror 26. By moving the light source 21 and plane reflecting mirror 22 to 24 into the direction shown by an arrow A, the original D on the contact glass 14 can be scanned and exposed. In this case, the light source 21 and plane reflecting mirror 22 move together and the main reflection board 23 and 24 also move together, and the moving speed of the former is set so as to be two times the moving speed of the latter. In the following description, the light source 21 and the plane reflecting mirrors 22 to 24 are collectively called the optical unit 2'.

The copying paper conveying unit 8 has a paper feeding roller 81, paper feeding path 22, resist roller 83, conveying roller 84, heating/fixing roller 85, and discharging roller 86. By driving the paper feeding roller 81, copying paper P are supplied sheet by sheet into the paper feeding path 82 from the paper cassette 16, copying paper P is led into the copy processing unit 4 where the toner image is transferred on the copying paper P, the toner image transferred on the copying paper P is heated and fixed by the heating/fixing roller 85, and the copying paper P is discharged onto the receiving tray 17. The copying paper conveying unit is not limited to such structure but a copying paper conveying unit of other known structure to those skilled in the art may be adopted including such structure, for example, as one which has the feeding side and discharging side on the same side with respect to the copy processing unit 4.

In the copy processing unit 4, there are disposed a charger 42, a developing unit 43, a transfer charger 44, a separating belt 45, and a cleaner 46 in that order around a photosensitive drum 41 which rotates in the direction shown by C in the diagram. An original image irradiated from the optical system 2 is caused to be formed at a specified portion on the surface of the photosensitive drum 41 charged uniformly by the charger 42, thereby forming a static latent image. Static charge on the peripheral edge of the surface of the photosensitive drum 41 where a static latent image is not formed is removed by the blank lamp (not shown in the diagram). Afterward, the static latent image is actualized into a toner image by the developing unit 43, and the toner image is transferred on the copying paper P by the transfer charger 44. The remaining toner is recovered by the cleaner 46. The copy processing unit is not limited to the structure referred to herein but a copy processing unit of other known structure may be adopted including such structure, for example, as one which uses a belt-like photosensitive body.

Figure 1:
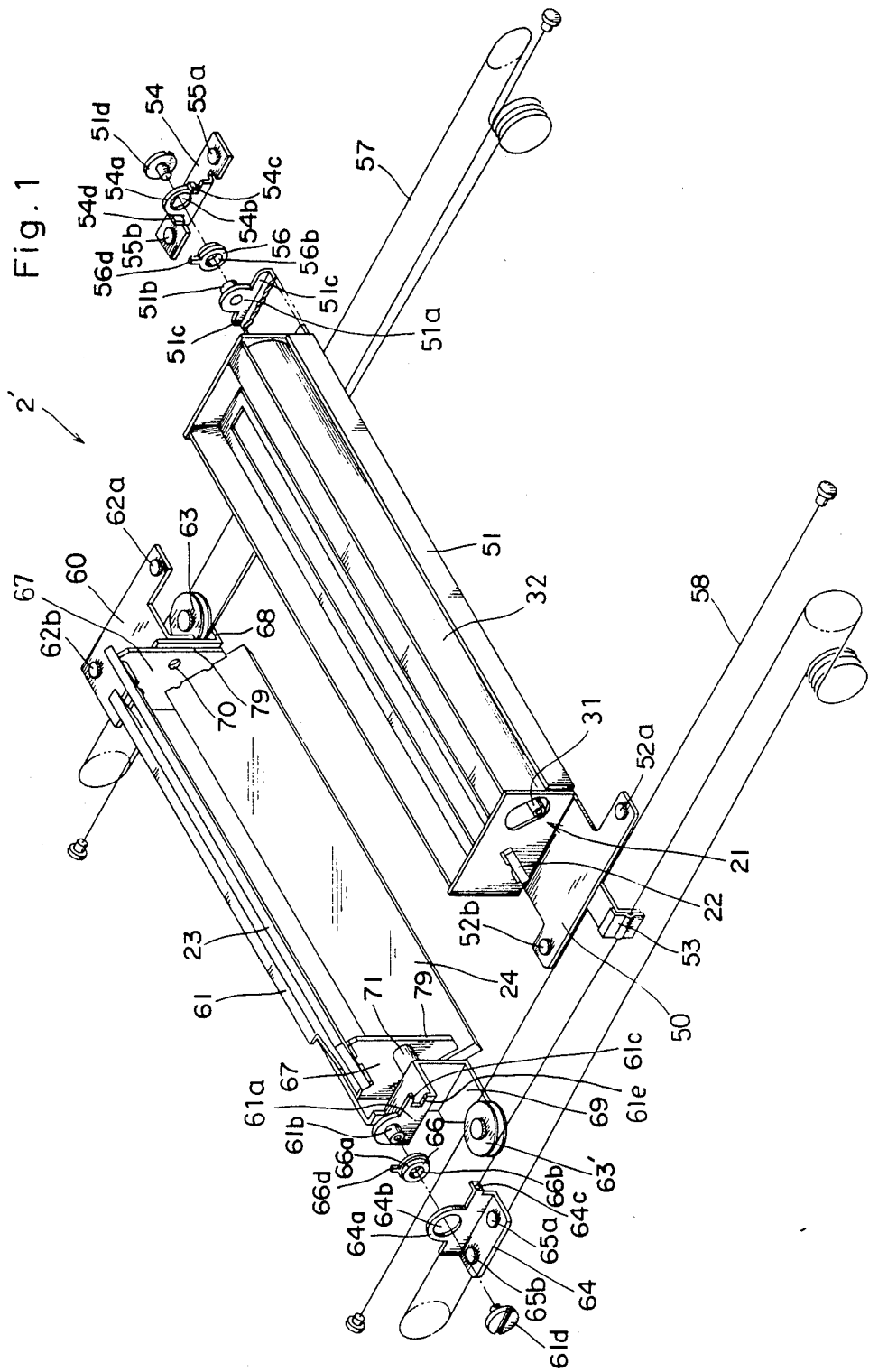
FIG. 1 is a perspective diagram of a supporting apparatus for an optical unit according to the present invention.
Figure 2:
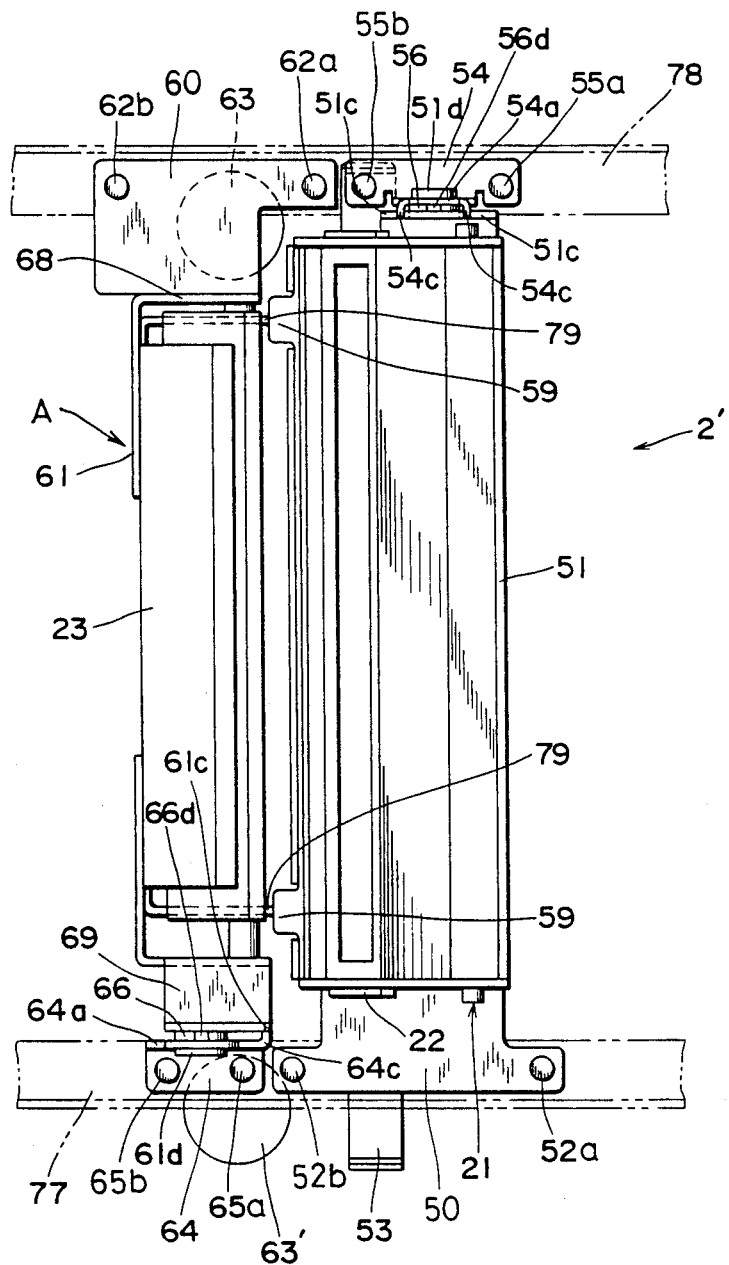
FIG. 2 is a plan view.

FIG. 1 is a perspective diagram showing the structure of the supporting apparatus according to the present invention and FIG. 2 is a plan view. The optical unit 2' has a first supporting frame body 51 which supports the light source 21 and reflecting mirror 22, a second supporting frame body 61 which supports the reflecting mirror 23, 24, and a pair of driving wires 57, 58 which provide moving force to both ends of both supporting frame bodies 51, 61. At a specified position of one end of the first supporting frame body 51 are installed a pair of sliding members 52a, 52b, and a driving wire connecting block 53 by means of a slide mounting block 50, and at a specified position of the other end of the first supporting frame body 51 are installed one driving wire connecting block (not shown in the diagram) and a pair of sliding members 55a, 55b by means of an end member 54.

Figure 5:
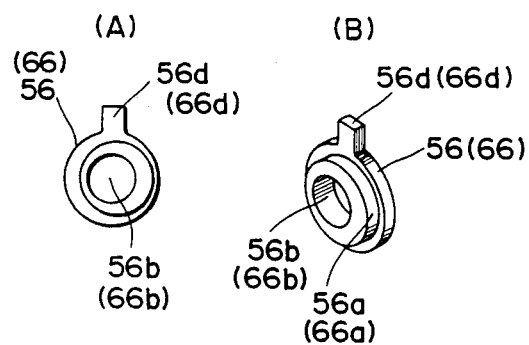
FIG. 5 is a perspective diagram and a front view showing the structure of the adjusting member.

To describe further in detail, the sliding members 52a, 52b, 55a, 55b are small pieces formed from fluorine-contained resin such as a polytetrafluoroethylene or other material of small frictional coefficient and are installed to protrude downward from respective bottoms of the sliding member mounting block 50 and the end member 54. On the end member 54 is upwardly formed a bent portion 54a at the middle portion of both sliding members 55a, 55b. At the center of the upward bent portion 54a is formed a circular through hole 54b and a pair of rotation restricting protrusions 54c, 54d are formed closely to the circular through hole 54b. At the other end of the first supporting frame body 51 installed an end member connecting block 51a formed by perpendicularly bending an end portion of a flat plate. On the end member connecting block 51a is protrudingly formed a shaft 51b whose diameter is smaller than the above circular through hole 54b, and a stopper 51c with which the aforementioned rotation restricting protrusions 54c, 54d can be engaged are formed closely to the shaft 51b. As shown in FIG. 5, an adjusting member 56 is provided with a shaft hole 56b to pass through the above shaft 51b and further a circular outer surface 56a which can be fitted into the circular through hole 54b of the above end member 54 is formed eccentrically with respect to the shaft hole 56b. By causing the shaft hole 56b of the adjusting member 56 to be inserted through the above shaft 51b, by causing the circular through hole 54b of the end member 54 to be inserted through the circular outer surface 56a of the adjusting member 56, and by screwing a screw-shaped stopping member 51d into the end of the shaft 51b, the above end member 54 can be held so as to freely rotate about the shaft 51b, in other words, in a status of a pendulum Note that 56d is a knob to rotate the adjusting member 56.

Figure 3:
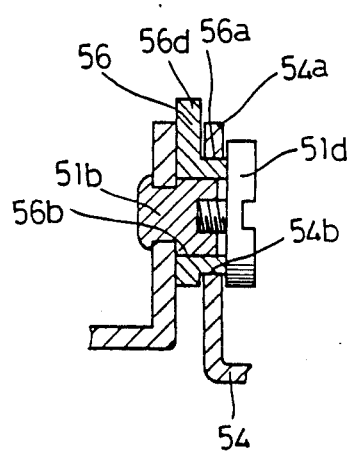
FIG. 3 is a vertical sectional view of an eccentric cam mechanism.

By referring to FIG. 3, the depth of the above circular outer surface 56a is greater than the thickness of the upward bent portion 54a of the end member 54, so that the protruding length of the above shaft 51b is smaller than the depth of the shaft hole 56b. Therefore, by screwing the stopping member 51d, it becomes possible to securely fix the adjusting member 56 to the shaft 51b and also to freely rotate the end member 54 about the shaft 51b. The gap between the sliding members 52a, 52b mounted unmovably with respect to the first supporting frame body 51 is made large to improve the stability while the first supporting frame body 51 is moving and the gap between the sliding members 55a, 55b mounted freely rotatably about the shaft 51b is made considerably small as compared with the gap between the above sliding members 52a, 52b.

At a specified position of one end of the second supporting frame body 61, there is mounted a pair of sliding members 65a, 65b consisting of material of small frictional coefficient such as the above fluorine-contained resin by means of a pulley 63' and an end member 64, and at a specified position of the other end, there is mounted a pair of sliding members 62a, 62b consisting of material of small frictional coefficient such as the above fluorine-contained resin by means of a pulley 63 and an end member 60.

More specifically, the second supporting frame body 61 has a reflecting mirror mounting portion 67 which is made by bending both ends of a flat plate at right angles, and to the outside of both ends of the above, supporters 68, 69 are connected unmovably by means of shafts 70, 71 and/or by welding (refer to the area A in FIG. 2). The supporter 68 mounts the pulley 63 by bending a lower end of a flat plate at right angle, and secures the end member 60 by bending an upper end of the flat plate in the form of letter L. The supporter 69 mounts the pulley 63′ by bending the lower end of a flat plate at right angle, and forms an end member connecting portion 61a by bending the upper end thereof at right angle and by further bending upward at right angle.

On the end member 64 of above is formed an upwardly bent portion 64a at the middle portion of both sliding members 65a, 65b. A circular through hole 64b is formed at the center of this upwardly bent portion 64a, and a rotation restricting protrusion 64c is formed closely to the circular through hole 64b. On the end member connecting portion 61a, a shaft 61b whose diameter is smaller than the above circular through hole 64b is formed to protrude, and a pair of stoppers 61c, 61e at a portion close to the shaft 61b are formed with which the above rotation restricting protrusion 64c can be engaged. On the adjusting member 66 is provided a shaft hole 66b to be inserted through the above shaft 61b, and a circular outer surface 66a which is insertable into the circular through hole 64b of the above end member 64 is formed eccentrically with respect to the shaft hole 66b. By causing the shaft hole 66b of the adjusting member 66 to be inserted through the above shaft 61b, by causing the circular through hole 64b of the end member 64 to be inserted through the circular outer surface 66a of the adjusting member 66, and by screwing the screw-shaped stopping member 61d into the end of the shaft 61b, the above end member 64 can be held so as to freely rotate about the shaft 61b, in other words, in a status of a pendulum. Note that 66d is a knob to rotate the adjusting member 66.

Because the mounting conditions of components such as the above end member 64 and adjusting member 66 are the same as those of the components such as the end member 54 and adjusting member 56 shown in FIG. 3, detailed description thereof are omitted.

With the above structure, the sliding members 62a, 62b, 65a, 65b will contact the upper surface of the sliders 77, 78 mounted respectively on the body 1 of the copying machine and the pulleys 63, 63′ will be positioned under the sliders 77, 78.

The gap between the sliding members 62a, 62b mounted unmovably with respect to the second supporting frame body 61 is made large to improve the stability during moving. The gap between the rotatably mounted sliding members 65a, 65b is made considerably small as compared with the gap between the above sliding members 62a, 62b.

Furthermore, at specified positions of the above first supporting frame body 51 and the second supporting frame body 61 respectively facing each to the other are formed the engaging portions 59, 79 to position both supporting frame bodies when widing the driving wires (refer to FIG. 2.).

Figure 4:
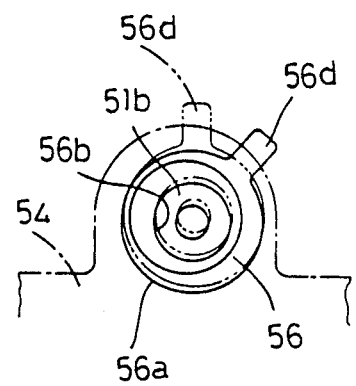
FIG. 4 is a diagram illustrating the operation of the eccentric cam mechanism.

As shown in FIG. 4, the horizontality adjustment of the first supporting frame body 51 can be easily accomplished by holding the knob 56d, with the stopping member 51d being loosened, so as to rotate the adjusting member 56 (by rotating from the status shown by two-dot chain line to the status shown by continuous line as shown in FIG. 4.). In a manner such as above, vertical positions of the sliding members 55a, 55b can be adjusted with respect to the supporting frame body 51, thereby it becomes possible to adjust the horizontality of the light source 21 and reflecting mirror 22. It is also possible to adjust vertical positions of the sliding members 65a, 65b with respect to the supporting frame body 61 and as a result of this, it becomes possible to adjust the horizontality of the reflecting mirrors 23, 24. After the horizontality adjustment of the light source 21 and reflecting mirrors 22 to 24 are completed, the adjusting members 56, 66 can be fixed by firmly screwing the stopping members 51d, 61d. As is apparent from the above description, the horizontality adjustment can be easily accomplished from the front of the copying machine or from the behind of the copying machine (i.e. in the direction vertical to the surface of the paper where FIG. 8 is shown) without having to remove the contact glass 14. This arrangement improves the working efficiency remarkably.

In the first supporting frame body 51, because the end member 54 is mounted capable of freely rotating about the shaft 51b, it becomes possible for the end member 54 to freely rotate about the shaft 51b even when the above stopping member 51d is tightened. By the free rotation of the end member 54 as stated above, each pair of the sliding members, in other words, a total of four sliding members 52a, 52b, 55a, 55b can be securely contacted continuously with the upper surfaces of the sliders 77, 78 (refer to FIG. 6). Furthermore, also in the second supporting frame body 61, because the end member 64 is mounted capable of freely rotating about the shaft 51b, it becomes also possible to maintain continuous contact of each pair of sliding members 62a, 62b, 65a, 65b with the upper surfaces of the sliders 77, 78 (refer to FIG. 7). Therefore, the force applied from each sliding member 62a, 62b, 65a, 65b onto the sliders become uniform thereby to control the wear of the sliding members and to maintain the quality of the obtained picture image to a high level. In a conventional structure where each sliding member is fixed unmovably with respect to the supporting frame body (Japanese Unexamined Patent Publication No. 37670/1983, U.S. Pat. Nos. 4,332,460, 4,353,643, etc.), if accuracy of the sliding member itself and/or the accuracy of installation of the sliding members are poor, either one of the sliding member will be supported on the slider in a condition which is nor adequate (e.g. in a tilted condition), resulting in wear. Therefore, the stability while the supporting frame body moves over the slider is deteriorated and vibration will be generated while moving. As a result of this, the picture image obtained is deflected and its quality is lowered.

After the horizontality adjustments of the supporting frame bodies 51, 61 are accomplished, the light source 21 and reflecting mirror 22 are settled to be at right angles with respect to the moving direction of the optical unit by adjusting the connecting conditions with respect to the driving wire connecting portion 53 of the driving wires 57, 58. Furthermore, by adjusting the winding conditions with respect to the pulleys 63, 63′ of the driving wires 57, 58, it becomes also possible to adjust the reflecting mirrors 23, 24 to be at right angles with respect to the moving direction of the optical unit. Therefore, in a process of forming picture images, deflection of the picture image can be prevented without fail thereby to obtain copied picture images of high quality when moving back and forth the supporting frame bodies 51, 61 by both driving wires 57, 58 of the above. In making focus adjustments as well, connecting conditions of the driving wire connecting portion 53 and the driving wire 58 can be simply adjusted. In addition, it is possible to adjust the deflection of the above picture image, so that the reflecting mirrors 23, 24 maintain a right angle with respect to the moving direction of the optical unit by rotating the pulley 63′ of the second supporting frame body 61 by changing the fixing position of the driving wire by such means as screws in a state that the driving wires are wound round the driving pulley (not shown in the diagram).

In the condition wherein the optical unit 2' has returned to the home position, as shown in FIG. 2, the sliding members 52a, 52b whose gap is large and the sliding members 65a, 65b whose gap is small come close together and the sliding members 62a, 62b whose gap is large and the sliding members 55a, 55b whose gap is small come close together. Therefore, the first supporting frame body 51 and the second supporting frame body 61 can be caused to come close together. Concretely, by causing both engaging portions 59, 79 to be kept engaged while winding the driving wires, it becomes possible to cause both engaging portions to come close together. As a result of this, the body 1 of the copying machine can be made still smaller.

Furthermore, because the above end members 54, 64 are mounted as being restricted of its rotating range with respect to the supporting frame bodies 51, 61 respectively, there is an advantage to insure the prevention of inconvenience in which the end members 54, 64 turn for 360° to be reversed upside-down while assembling the optical unit 2'.

FIG. 9 is a perspective diagram illustrating another embodiment of the optical unit supporting apparatus, in which the optical unit 2' equipped with this optical unit supporting apparatus has a first supporting frame body 103 which supports a light source 101, and a reflecting mirror 102, a second supporting fame body 105 which supports reflecting mirrors 104a, 104b, and a pair of driving wires 106, 107 which provides moving force for both ends of both supporting frame bodies 103, 105. On one end of the above first supporting frame body 103 is fixed a base plate 114, at the specified position of the base plate 114 is connected an end member 110 which is vertically movable with respect to the base plate 114, and at the specified position of the end member 110 is mounted one sliding member 108 which comprises material of small frictional coefficient such as fluorine-contained resin. The numeral 109 is a driving wire connecting portion fixed to the base plate 114. At the specified position of the other end of the supporting frame body 103 are installed a pair of sliding members 112a, 112b and a driving wire connecting portion 117. In addition, at the specified position of one end of the above second supporting frame body 105 is installed a pair of sliding members 121a, 121b, and at the specified position of the other end thereof is installed one sliding member 123.

More specifically, as shown in FIG. 12, the above base plate 114 has a bent portion 114a which is bent downward at right angle, and this bent portion 114a is formed with small protrusions 114b, 114c which are respectively inserted into two holes 110b, 110c of the end member 110, and a tapped hole 118 used to fasten a screw-shaped stopping member 119. The end member 110 is formed with the above two holes 110b, 110c with the former being on top and the latter being on bottom, and is also formed with a longitudinal through groove 110d which extends vertically. The upper part of the end member 110 is formed with a bent portion 110a which extends horizontally and outwardly, and the center of the bent portion 110a is fixed with the above sliding member 108. The lower part of the end member 110 is formed with a bent portion 110e which extends horizontally and outwardly to receive the lower end of an adjusting member 111. This adjusting member 111 is circular in shape and one plane on the side which contacts the end member 110 is provided with an eccentrically disposed cylindrical protrusion 111a which is fitted into the above through groove 110d. 111b represents a rotating groove which causes the adjusting member 111 to rotate by such means as a coin or screwdriver. Furthermore, a position corresponding to the center of the above cylindrical protrusion 111a is formed with a shaft hole 111c to insert through the stopping member 119, and the stopping member 119 inserted through the shaft hole 111c can be screwed into the tapped hole 118 formed in the above base plate 114. As shown in FIG. 10, the protruding height of the cylindrical protrusion 111a provided on the above adjusting member 111 is disposed to be smaller than the thickness of the end member 110. When the stopping member 119 is slightly loosened, the adjusting member 111 is disposed to enable itself to rotate about the stopping member 119.

The holes 110b, 110c are inserted respectively with small protrusions 114b, 114c and the cylindrical protrusion 111a are passed through the through groove 110d, the stopping member 119 is inserted through the shaft hole 111c and loosely screwed into the tapped hole 118. Then by rotating the adjusting member 111 using the rotating groove 111b, the end member 110 is caused to move vertically with respect to the base plate 114. To describe this motion using FIG. 11, in a condition where the center of the adjusting member 111 is flush with the center of the cylindrical protrusion 111a (FIG. 11(A)), the cylindrical protrusion 111a is positioned at the center of the through groove 110d and the end member 110 is in a standard positional relation which is neither high nor low with respect to the base plate 114. If, however, the adjusting member 111 is caused to rotate in a direction so that the center of the adjusting member 111 is lower than the center of the cylindrical protrusion 111a (FIG. 11(B)), the lower end of the adjusting member 111 pushes the bent portion 110e downward As a result of this, the end member 110 moves downward with respect to the base plate 114. In other words, the base plate 114 moves upward with respect to the end member 110, thus, it becomes possible by the above motion to lift the first supporting frame body 103 with respect to the slider 115 because the end member 110 is in contact with the upper surface of the slider 115 by means of the sliding member 108. Still more, upward moving distance of the base plate 114 with respect to the end member 110 is restricted to a fixed distance by causing the small protrusions 114b, 114c to contact with the upper wall of the holes 110b, 110c. Though not shown in the diagram, if the adjusting member 111 is rotated in a direction so that the center of the cylindrical protrusion 111a is lower than the center of the adjusting member 111, the distance between the center of the cylindrical protrusion 111a and the lower end of the adjusting member 111 gradually becomes short, while the base plate 114 moves downward with respect to the end member 110 by the weight of the first supporting frame body 103. Downward moving distance of the base plate 114 is restricted to a fixed distance by causing the small protrusions 114b, 114c to contact the lower wall of the holes 110b, 110c. As in the manner stated above, by adjusting the rotating angle of the adjusting member 111, it becomes possible to make vertical adjustment of the sliding member 108, which in turn enables to adjust the horizontality of the first supporting frame body 103 as well as the horizontality of the optical unit 2'.

In this embodiment, unlike the embodiment shown in FIG. 1, the sliding member 108 is consisted of one member. Therefore, it is possible to provide supporting means of a pair of sliding members 112a, 112b disposed on the other end of the supporting frame body 103 together with the above one member, a total of three point supports, thereby to enable the supporting frame body 103 to be supported continuously on the sliders 115, 116 with substantial stability. As a result of this, without providing a structure wherein the end members 54, 64 are rotatably installed about the shaft 51b as shown in the embodiment in FIG. 1, it is possible to secure a condition in which each sliding member 108, 112a, 112b is caused to be in positive contact with the sliders 115, 116. In the embodiment of FIG. 9, the sliding member 108 is provided through the eccentric cam mechanism on one end of the first supporting frame body 103 only, however, a same sliding member can be provided on one end of the second supporting frame body 105.

The present invention has been described in detail as above by referring to the attached drawings and based on embodiments of the optical unit supporting apparatus, but the present invention shall not be limited only to the aforementioned embodiments and should be understood that various other changes may be provided without departing from the scope and the spirit of the essential characteristics of the present invention.

According to the optical unit supporting apparatus of the present invention as stated above, because one side of the sliding members mounted on both ends of the supporting frame body equipped with the optical unit is supported vertically adjustably by means of the eccentric cam mechanism, horizontality adjustment of the optical unit supporting apparatus can be easily accomplished by operating the eccentric cam mechanism only. Consequentially, such conventional means to prevent machine screw from loosening as paint locking can be eliminated, and yet, the above adjustment can be made from a horizontal direction without removing the contact glass and the working efficiency will be improved.

Also in the optical unit supporting apparatus according to the present invention, by causing a pair of sliding members mounted on one end of the supporting frame body to contact the upper surface of the slider and by providing a large gap between the sliding members, it becomes possible to expose originals without causing deflection in the optical unit. Furthermore, because the ends of the two supporting frame bodies where the sliding members are mounted are mutually disposed at reverse side, it becomes possible at their home positions to dispose both supporting frame bodies to be close to each other, thereby accomplishing reduction in size of the picture image forming apparatus.

What is claimed is:

1. A supporting apparatus for an optical unit comprising a first reciprocatingly movable supporting frame body equipped with a light source to illuminate an original set on a contact glass, a second reciprocatingly movable supporting frame body equipped with a reflecting mirror to reflect light reflected from the original, at least one of the supporting frame bodies having first and second ends which have sliding means mounted thereon, said sliding means on the first end of the supporting frame body including a pair of spaced apart sliding members which are normally fixed relative to the supporting frame body, sliding means on the second end of the supporting frame body, and an eccentric cam mechanism provided on said second end of the supporting frame body for adjustably connecting the second end of the supporting frame body to its respective sliding means, said eccentric cam comprising the only connection between the second end of the supporting frame body and the respective sliding means so that the supporting frame body is supported at only three points.

2. A supporting apparatus for an optical unit according to claim 1 wherein the sliding means at the second end of the supporting frame body includes two sliding members which are connected to the supporting frame body by said eccentric cam mechanism, said eccentric cam mechanism having a shaft about which the two sliding members are freely swingable.

3. A supporting apparatus for optical unit according to claim 1, wherein the sliding member is a small piece consisting of a material having a small frictional coefficient.

4. A supporting apparatus for optical unit according to claim 3, wherein a rotating range of said pair of sliding members capable of free rotation is restricted to a fixed range.

5. A supporting apparatus for an optical unit in which an original is set on a contact glass, comprising,
   a first supporting frame body equipped with a light source to illuminate an original placed on the contact glass, and a second supporting frame body equipped with a reflecting mirror to reflect light reflected from the original,
   each of said supporting frame bodies having a first end provided with a first sliding means for sliding longitudinally on a first slider track, and a second end provided with a second sliding means for sliding longitudinally on a second slider track;
   said first sliding means on the first supporting frame body having a longitudinal measurement which is large relative to the longitudinal measurement of the second sliding means on the first supporting frame body,
   said second sliding means on the second supporting frame body having a longitudinal measurement which is large relative to the longitudinal measurement of the first sliding means on the second supporting frame body.

6. A supporting apparatus for optical unit according to claim 5, wherein the sliding member is a small piece consisting of a material having small frictional coefficient.

7. A supporting apparatus for optical unit according to claim 5, wherein said pair of sliding members can freely rotate about a rotating shaft.

8. A supporting apparatus for optical unit according to claim 7, wherein a rotating range of said pair of sliding members capable of free rotation is restricted to a fixed range.

* * * * *